United States Patent [19]

Ziegler et al.

[11] Patent Number: 4,652,292
[45] Date of Patent: Mar. 24, 1987

[54] METHODS FOR FORMING GLASS ARTICLES

[75] Inventors: Michael J. Ziegler, Parma Heights; F. Richard Simpkins, Newbury, both of Ohio

[73] Assignee: AGA AB, Sweden

[21] Appl. No.: 798,614

[22] Filed: Nov. 15, 1985

Related U.S. Application Data

[63] Continuation-in-part of Ser. No. 600,410, Apr. 16, 1984, Pat. No. 4,553,999.

[51] Int. Cl.$^4$ .............................................. C03B 9/36
[52] U.S. Cl. ......................................... 65/84; 65/81; 65/85; 65/114
[58] Field of Search ................... 65/32, 74, 81, 84, 85, 65/114, 137

[56] References Cited

U.S. PATENT DOCUMENTS

| Re. 28,497 | 7/1975 | Gasmire | 65/137 X |
|---|---|---|---|
| 1,653,848 | 12/1927 | Grotta . | |
| 1,854,471 | 4/1932 | Hofmann . | |
| 2,123,245 | 7/1938 | Peiler | 65/262 |
| 3,236,620 | 2/1966 | Wiley | 65/262 |
| 3,328,148 | 6/1967 | Belentepe et al. | 65/82 |
| 3,350,189 | 10/1967 | Nowak | 65/84 X |
| 4,553,999 | 11/1985 | Ziegler et al. | 65/84 |

FOREIGN PATENT DOCUMENTS

1005950 1/1952 France .................. 65/114

OTHER PUBLICATIONS

*The Handbook of Glass Manufacture*, Fay V. Tooley, Editor, Books for Industry, Inc., New York, 1974, vol. II, pp. 609-614 and 637-654.

*Primary Examiner*—Arthur Kellogg
*Attorney, Agent, or Firm*—David A. Burge

[57] ABSTRACT

Methods for forming glass articles such as bottles and the like utilize pressurized flows of a cold blowing gas that is delivered from an insulated manifold into mold cavitites which are being used to mold glass articles. The cold blowing gas is a mixture of compressed cryogen vapor and ambient air that has been dehumidified, with the injection of the cryogen vapor into the ambient air being performed in stages, and utilizing a technique of cyclically operating and defrosting a plurality of cryogen injectors to assure a proper introduction of cryogen vapor and to prevent debilitating accumulations of ice about the cryogen inlets. The use of cryogen vapor in the blowing gas hastens cooling and solidification of newly formed glass articles so that the time during which the articles must be retained in their molds is significantly reduced. Reductions in mold retention times enable the apparatus to be operated at increased speeds, whereby its productivity is significantly increased. Productivity increases of 15 percent and often more can be achieved at relatively low expense. The use of cold cryogen vapor introduction into mold cavitites is applicable to a variety of glass molding techniques including press molding and blow molding.

26 Claims, 10 Drawing Figures

PRIOR ART

METHODS FOR FORMING GLASS ARTICLES

CROSS REFERENCE TO RELATED APPLICATION

The present application is a continuation-in-part of co-pending application Ser. No. 600,410, filed Apr. 16, 1984, by Michael J. Ziegler, et al, entitled METHODS AND APPARATUS FOR BLOW MOLDING GLASS ARTICLES, issued Nov. 19, 1985, as U.S. Pat. No. 4,553,999, hereinafter referred to as the "Parent Case", the disclosure of which is incorporated herein by reference.

BACKGROUND OF THE INVENTION

1. Field of the Invention

The present invention relates generally to the manufacture of glass articles such as bottles and the like, and more particularly, to methods and apparatus for providing increased productivity in a glass manufacturing process by utilizing a cold blowing gas that is delivered from an insulated manifold, with the cold blowing gas being a mixture of compressed cryogen vapor and ambient air that has been dehumidified, with the injection of the cryogen vapor into the ambient air being performed in stages by utilizing cryogen injectors that are cycled into and out of operation to provide for defrosting and to prevent debilitating accumulations of ice, and with the flows of pressurized cold blowing gas being introduced into mold cavities to hasten the cooling and solidification of newly molded glass articles.

2. Prior Art

In the molding of glass articles such as bottles and the like, a hollow blank or parison of glass is typically formed in a roughing mold, and is inserted into a finishing mold where it is expanded to form an article of desired form. The hollow blank of glass is typically formed by pressing a gob of glass and/or by using a pressurized flow of ambient air as a blowing gas to conform the gob to a desired configuration. The resulting blank roughly approximates the shape of the final article that is to be molded, but has thicker walls and is smaller in size. The blank is expanded in the finishing mold to conform to a desired configuration as defined by the finishing mold. Expansion of the blank is typically effected by pressing and/or by using a pressurized flow of ambient air as a blowing gas.

In the molding of a preliminary article of glass such as a hollow blank or parison, and in the molding of articles of final form such as bottles, it is not uncommon to utilize flows of cooling gas that are directed toward the newly molded articles while the articles are still contained within their mold cavities to speed cooling and solidification of the articles so they can be removed as quickly as possible from their molds. The cooling gas is typically ambient air that has been pressurized by a blower. The cooling gas is typically fed from a manifold through a control valve and ducted into the mold cavities, with the gas having temperatures that lie within a range of about 90 to 100 degrees Fahrenheit, and sometimes higher. Where the articles being molded have been formed using blow-molding techniques, the blowing gas also typically comprises blower-pressurized ambient air that is ducted into the mold cavities at temperatures that lie within a range of about 90 to 100 degrees Fahrenheit, and sometimes higher. In most applications, the flows of cooling gases are uninterrupted extensions of the flows of blowing gases that are delivered into the mold cavities to blow-form articles therein.

In order to further speed the cooling of molded glass articles to diminish their mold retention times, proposals have been made to indirectly cool the articles by providing at least portions of their molds with cooling passages through which a fluid coolant is circulated. However, the degree to which mold cooling can be used to indirectly cool molded glass articles is limited not only by the tendency of this approach to induce defects (the number of defects induced in molded glass articles increases as mold temperatures are diminished), but also by the cost of forming cooling passages in the molds, and by the cost of providing suitable apparatus for maintaining controlled flows of coolant through the cooling passages.

While mold cooling provides some assistance in diminishing mold retention times, the retention times during which newly molded glass articles must be held in their molds to effect proper solidification continue to form "bottlenecks" that obstruct efforts to increase the productivity of existing molding equipment.

3. The Referenced Parent Case

The system of the referenced Parent Case addresses the foregoing and other drawbacks of prior proposals by providing a novel and improved system which utilizes flows of pressurized cold cryogen vapor that are introduced into mold cavities to hasten solidification of glass articles which are being molded therein. In the preferred practice described in the Parent Case, flows of pressurized cold cryogen vapor are used both to cool glass articles that are being molded and to effect blow-molding of the articles. By using cold cryogen vapor in this manner, mold retention times for molded glass articles are significantly reduced, thereby permitting correspondingly significant increases in productivity. As is discussed in the Parent Case, productivity increases of 15 percent and often more are achievable at the relatively low expense that is associated with introducing flows of pressurized cold cryogen vapor into the paths of flow that have traditionally been utilized to duct blowing and/or cooling gases to the mold cavities.

While the Parent Case describes a "most preferred practice" that uses a manifold to deliver compressed air to mold inlets through one system of supply conduits, and that uses a cryogen supply header to deliver cryogen vapor to the mold inlets through a separate set of conduits, difficulties have been encountered in the implementation of this most preferred practice in that the provision of flexible cryogen supply conduits and/or the provision of cryogen supply conduits that have relatively movable components has been found to present a significant challenge which has not been well met by present day technology. Stated in another way, while operable cryogen supply conduits have been made and used in prototype apparatus that embodies the described "most preferred practice," such conduits have been found to not perform in as long-lived and reliable a manner as is desired in a true production environment.

Thus, the practice of the invention of the Parent Case that has been found most practical for present commercial use has been what the Parent Case describes as its "less preferred embodiment," wherein a single set of supply lines is utilized to deliver a cold blowing gas from a manifold to the mold inlets, wherein the cold blowing gas is a mixture of cold cryogen vapor and ambient air. As is explained in the referenced Parent case, a drawback of the practice of this "less preferred embodiment" is that the gas mixture that is supplied to the manifold cannot be much lower in temperature than about 35 degrees Fahrenheit because, if lower temperatures are employed, debilitating buildups of ice will form due to condensation of such water vapor as is present in the ambient air, and these ice buildups will block proper feeding of the gas. As will be apparent, the improvements of the present invention address the problem of these debilitating ice buildups, and provide a system that renders quite attractive the use of what was referred to in the referenced Parent Case as the "less preferred embodiment."

4. The Blow Molding of Glass vs. Plastics Materials

As is explained in the referenced Parent Case, the use of flows of cold cryogen vapor that are introduced into mold cavities is applicable to a variety of glass molding techniques including press molding and blow molding. Cold cryogen vapor introduction can be used in single stage molding procedures as well as in plural-stage molding procedures. In a single stage press-molding procedure, for example, a flow of cold cryogen gas may be introduced into a mold cavity to cool a press-molded article and to cool the plunger that has formed inner surface portions of the article. In a plural stage molding procedure, for example where a hollow blank or parison of glass is first press-formed in a roughing mold, and is then blow-molded in a finishing mold to assume its final form, flows of pressurized cold cryogen vapor may be introduced into the mold cavities in either or both of the roughing and finishing stages to expedite solidification and to permit increased productivity.

However, as was pointed out during the prosecution of the referenced Parent Case, the use of cold blowing gas in the blow molding of glass containers is not analogous to the use of cold blowing gas in conjunction with the blow molding of articles formed from plastics material. Plastics material and glass are such different substances, having such different properties, that it is not at all "obvious" to transfer teachings from the art of plastics blow molding to the art of glass blow molding, or vice versa.

Plastics material and glass "set up," "harden," or "solidify" in very different ways, and have very different sensitivities and reactions to temperature shock. A twelve ounce container formed from plastics material typically weighs about 50 grams. To reduce the temperature of 50 grams of plastics material from a typical blow molding temperature of about 360 degrees Fahrenheit to a typical mold discharge temperature of about 90 degrees Fahrenheit requires the extraction of about 16.3 BTU of heat energy. In contrast, a similarly configured 12 ounce container formed from glass weighs typically about 400 grams. To diminish the temperature of a 12 ounce glass container from a blow molding temperature of about 1,350 degrees Fahrenheit to a typical discharge temperature of about 750 degrees Fahrenheit requires a heat energy release of about 105.6 BTU. Because the thermal conductivities of glass and plastics material (e.g. high density polyethylene) are roughly equal, the much higher heat removal requirement of glass would suggest that the glass container must take more than six times as long to cool sufficiently to open the mold; however, this is not at all the case.

In actual practice, the container that is formed from plastics material actually has about a one-half second longer cooling time than does the glass container, this being due to the vast physical differences between plastics material and glass. Because plastics containers will warp if they are removed from their molds before all portions of the containers' mass have cooled sufficiently, mold retention time for plastics containers must be quite protracted. The long, chain-like molecules that form in the solidification of plastics material during cooling tend to orient themselves differently depending upon the manner in which temperature changes are effected. If one section of a plastics container is "hot" (i.e., insufficiently cooled) when the mold opens, the container will "suck in" or "pucker" as the molecules of plastics material contract during cooling. By keeping the container in the mold, under pressure, during cooling, the plastics container will be forced to retain its shape until all of the necessary heat has been removed.

Glass, on the other hand, has no interlocking chains of molecules. Instead, it has very loosely attracted molecules which actually flow at room temperature. Indeed, glass is technically still a "liquid" at 70 degrees Fahrenheit. The very different cnaracters of plastics material and glass result in very different cooling situations as plastics and glass blow-molded containers are cooled.

While uneven cooling or a glass blow-molded container may create stress points, it does not cause significant warpage. Such stress points as are created in the forming of glass containers are dealt with by passing the containers through a lehr, a long furnace which tempers the glass by reheating it to around 900 degrees Fahrenheit, whereafter the glass is gradually cooled to allow the stress points to relieve themselves. Since the glass containers are put through a lehr, the only cooling that is necessary in conjunction with glass blow molding is a sufficient amount of cooling to assure that molded containers will retain their shape once they have been extracted from the bare molds. Thus an opportunity is presented in the blow molding of glass containers that is not available in the blow molding of forming plastics containers, namely an opportunity to speed up production by discharging newly formed containers from their molds the instant that they become only partially cooled to an extend that they are self supporting and structurally stable.

What the invention of the Parent Case recognizes is that, in the blow molding of hollow glass articles, the only cooling of a newly blow molded glass article that is necessary in order to permit the immediate discharge of the article from its mold is an amount of cooling that is adequate to give the glass enough strength to hold its shape. The invention of the Parent Case addresses this very "minimal need" for cooling in a special way, namely by employing a very fast acting cooling technique that results in creating what essentially amounts to a solidified "skin" on the interior surface of newly formed hollow glass articles. Once this interior "skin" has been cooled sufficiently to act as a stable mainstay that will can be opened and the newly molded articles can be removed. The fast formation of an adequately cooled and rigidified interior "skin" permits a newly blow molded glass article to be extracted far more quickly from its mold than previously has been possible with prior glass blow-molding cooling techniques. Thus the molds can be recycled and reused more quickly than has previously been thought to be possible, and a very significant increase in productivity of blow molded articles is achieved while utilizing existing production facilities.

SUMMARY OF THE INVENTION

The present invention represents the work product of a continuing program of development that initially gave rise to the invention of the referenced Parent Case. The system of the present invention relates to the blow molding of hollow glass articles by utilizing a cold blowing gas that is a mixture of cold cryogen vapor and ambient air which has been dehumidified, with the injection of the cold cryogen vapor into the ambient air being performed in stages, and utilizing a technique of cycling of the cryogen vapor inlets to prevent the buildup of debilitating accumulations of the ice about the cryogen inlets, and to defrost the inlets on a cyclic basis to relieve any ice buildup that does occur.

The system of the present invention (like the system of the referenced Parent Case) expedites the production of blow-molded articles of glass by rapidly cooling inner surface portions of the walls of a hollow blow-molded container to a degree that will cause what can be thought of as an interior "skin" to form that will provide dimensional strength (i.e., shape stability) to the hollow article, whereby the article can be removed from its mold even before all portions of the article have fully solidified, thus enabling the mold to be promptly re-used to form another article.

The system of the present invention constitutes an improvement in the implementation of what is described in the referenced Parent Case as a "less preferred" practice or embodiment.

The system of the present invention, like that of the referenced Parent Case, takes advantage of the discovery that, once an interior surface skin has been formed in a newly molded glass article (as by the introduction into the hollow article of a relatively cold blowing gas), this interior skin may be utilized to provide shape stability for the newly formed article, i.e., to cause the article to hold its shape as remaining heat is released from the article after the article has been removed from the mold. Thus, newly blow-molded articles of glass may be removed quite quickly from their molds, and the molds may be recycled and reused while the articles are completing their solidification. Although stress points often form as the result of this kind of "expedited removal skin-forming process" (indeed, stress points form in the cooling of almost any conventionally blow-molded glass articles), such stress points as form may be relieved in a conventional manner by tempering the glass (as is always done in conventional practice) in a lehr.

BRIEF DESCRIPTION OF THE DRAWINGS

Other features and a fuller understanding of the invention may be had by referring to the following description and claims, taken in conjunction with the accompanying drawings, wherein:

DESCRIPTION OF THE PREFERRED EMBODIMENT

Referring to FIGS. 1 through 4, four work stations of a glass blank molding apparatus are indicated generally by the numerals 10, 20, 30, 40. The work stations 10, 20, 30, 40 are utilized herein to depict a conventional series of sequential steps that are carried out by automated glass molding machinery to press-form a gob of glass, indicated by the numeral 50 in FIG. 1, to form an article of intermediate configuration, indicated by the numeral 52 in FIG. 2, and thence a hollow blank or parison of glass, indicated by the numeral 54 in FIGS. 3 and 4.

Figure 1:
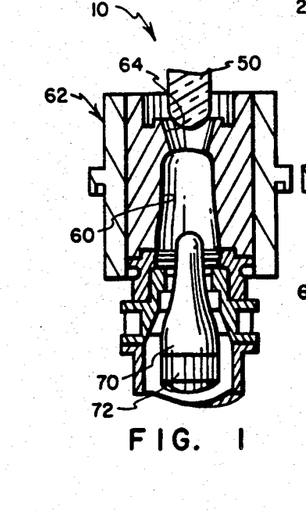
FIGS. 1 through 4 are schematic side elevational views, partially in cross-section, illustrating sequential steps in the press-forming and cooling of a preliminary glass article, namely a hollow blank or parison of glass.
Figures 2, 3:
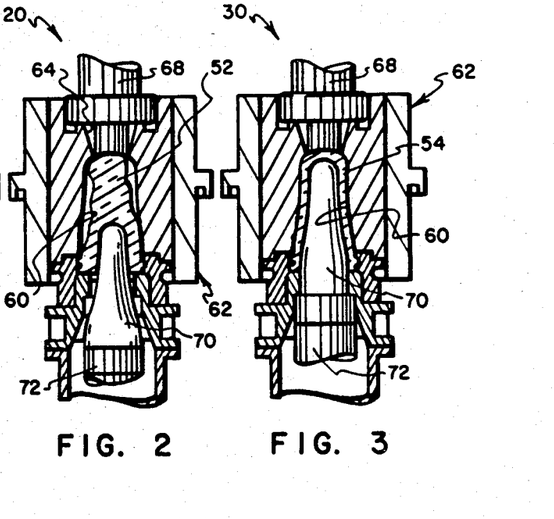
Figures 4, 5, 6:
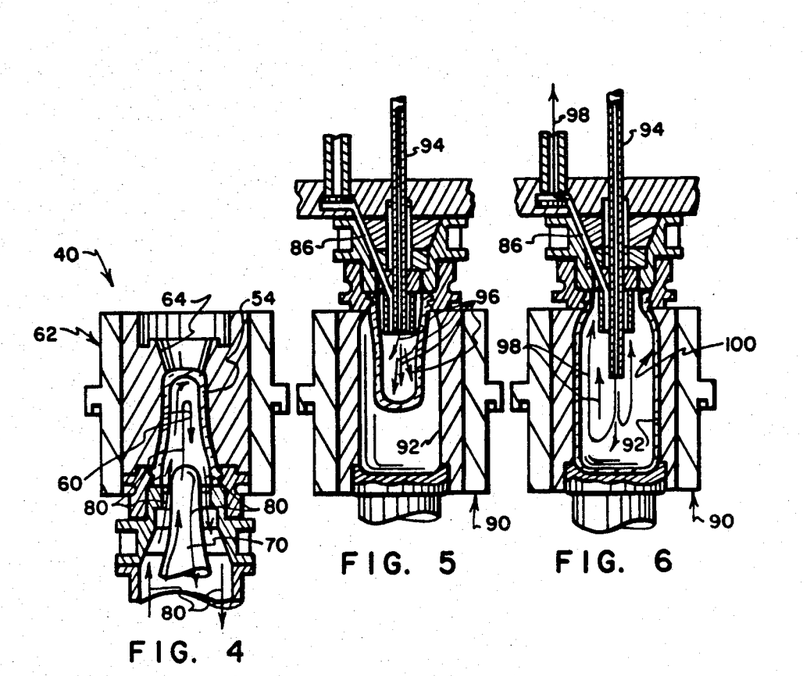
FIGS. 5 and 6 are schematic side elevational views illustrating sequential steps wherein the hollow blank or parison of glass that is formed in the process depicted by FIGS. 1-4 is blow-molded and cooled in a finishing mold to complete the molding of the final form of a glass article such as a bottle.

In the sequence of steps depicted by FIGS. 1-4, the gob 50 is introduced into a mold cavity 60 of a mold assembly 62 through an open upper end 64, as is illustrated in FIG. 1. When the gob 50 is in place in the mold cavity 60, the open upper end 64 is closed by an upper plunger 68, and a mold core 70 is pressed into the cavity 60 by a lower plunger 72, as is illustrated in FIG. 2. Insertion of the mold core 70 is continued until the modified formation of the gob 50, as is indicated by the numeral 52 in FIG. 2, has been conformed to the shape of the mold cavity 60, whereby the hollow blank or parison 54 of FIG. 3 is formed. The mold core 70 is then withdrawn, as is depicted in FIG. 4, so that flows of cooling gases, as are indicated by arrows 80, can be directed into and through the mold cavity 60 to cool the newly formed hollow blank or parison 54.

As soon as the hollow blank or parison 54 has cooled (i.e., solidified) sufficiently to render it stable for transport and inversion, a conventional apparatus (not shown) for transporting and inverting the blank 54 is used to move the blank 54 to a finishing mold assembly 90, as is depicted in FIG. 5. The blank 54 is inserted into a mold cavity 92 that is defined by the mold assembly 90. Blow-molding gases are ducted into the hollow interior of the blank 54 through a blow tube 94, as is conventional, to effect expansion of the blank 54 to conform its shape to that of the cavity 92. The flow of blow-molding gas into the blank 54 is indicated in FIG. 5 by arrows 96.

As the blow-molding gas 96 continues to be supplied to the interior of the blank 54, the blank 54 is expanded, whereby a glass article such as the bottle 100 is formed, as is depicted in FIG. 6. Once the bottle 100 has been formed in the mold assembly 90, a flow of cooling gas, indicated by arrows 98 in FIG. 6, is established through the interior of the bottle 100 by introducing the cooling gas 98 through the blow tube 94, and by discharging the cooling gas 98 through one or more valve-controlled passages 86 that are formed in the mold assembly 90. In most applications, the blowing gas 96 and the cooling gas 98 are supplied as an uninterrupted, continuous flow of the same gaseous medium.

Figures 7, 8:
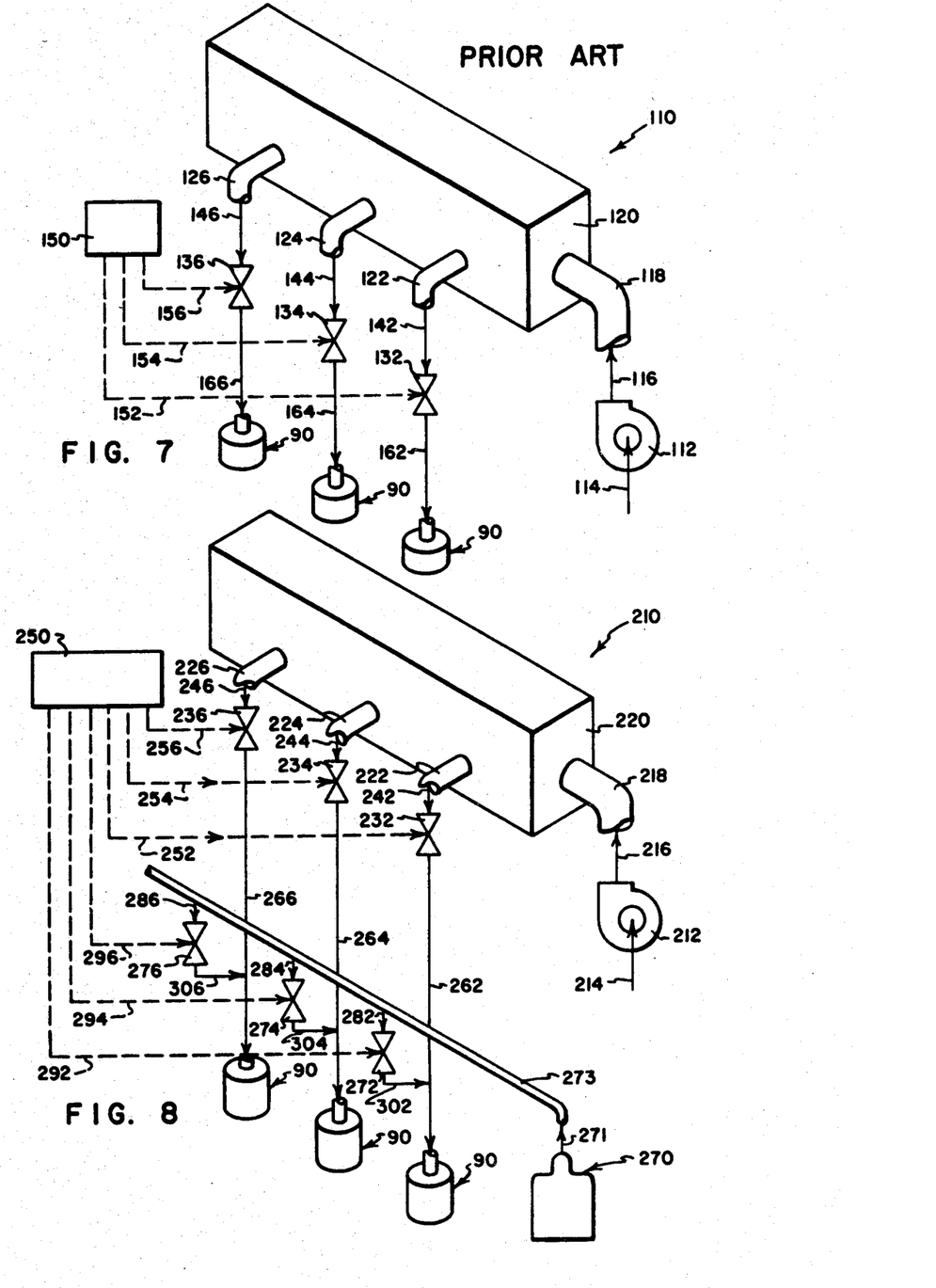
FIG. 7 is a schematic diagram of a gas supply system of the type conventionally used to supply blow-molding and/or cooling gases to mold cavities for use in blow-molding and/or cooling glass articles that are being molded.
FIG. 8 is a schematic diagram of a substitute gas supply system that incorporates features of a "preferred practice" of the invention of the referenced Parent Case.

Referring to FIG. 7, a conventional system for supplying flows of blow-molding gases and/or cooling gases is indicated generally by the numeral 110. The system 110 includes a blower 112 for receiving ambient air, as is indicated by an arrow 114, and for compressing the ambient air 114 to form a pressurized supply of ambient air, as is indicated by an arrow 116. The compressed air 116 is fed through a supply conduit 118 to a pressurized air manifold 120. The manifold 120 acts as a reservoir of pressurized air, and as a source for supplying pressurized air to conduits such as those indicated by the numerals 122, 124, 126. The conduits 122, 124, 126 duct pressurized air to control valves 132, 134, 136, as is indicated by arrows 142, 144, 146. The valves 132, 134, 136 operate in response to electrical or pneumatic signals 152, 154, 156 which are received from a control unit 150 to duct pressurized air, as indicated by arrows W 162, 164, 166, to mold assemblies such as the previously described mold assemblies 62, 90. The flows of pressurized air that are indicated schematically by the arrows 162, 164, 166 in FIG. 7 may represent supplies of blowing and/or cooling gases, such as are indicated by the arrows 80, 96 and 98 in FIGS. 4, 5 and 6, respectively.

As will be readily apparent to those skilled in the art, the apparatus and molding techniques described with reference to FIGS. 1-7 are conventional in nature and represent a manner in which glass articles such as bottles and the like are commonly blow-molded in automatic molding machinery. The apparatus depicted in FIGS. 1-7 is typical of such apparatus as may advantageously employ features of the present invention.

In accordance with what has been described in the referenced Parent Case as being the "preferred practice" of the invention of the Parent Case, such conventional gas supply systems 110 as are depicted in FIG. 7 preferably are replaced by more sophisticated gas supply systems of the type indicated generally by the numeral 210 in FIG. 8. One or more of the systems 210 operates to supply blowing gases and/or cooling gases, as indicated by the arrows 80, 96 and 98 in FIGS. 4, 5 and 6, respectively, to the apparatus illustrated in FIGS. 1-6.

Referring to FIG. 8, the system 210 includes a blower 212 for receiving ambient air, as is indicated by an arrow 214, and for compressing the ambient air 214 to form a pressurized supply of ambient air, as is indicated by an arrow 216. The compressed air 216 is fed through a supply conduit 218 to a pressurized air manifold 220. The manifold 220 acts as a reservoir of pressurized air, and as a source for supplying pressurized air to conduits such as those indicated by the numerals 222, 224, 226. The conduits 222, 224, 226 duct pressurized air to control valves 232, 234, 236, as is indicated by arrows 242, 244, 246. The valves 232, 234, 236 operate in response to electrical or pneumatic signals 252, 254, 256 which are received from a control unit 250 to duct pressurized air, as indicated by arrows 262, 264, 266, to mold assemblies such as the previously described mold assemblies 62, 90. The flows of pressurized air that are indicated schematically by the arrows 262, 264, 266 in FIG. 8 may represent supplies of blowing and/or cooling gases, such as are indicated by the arrows 80, 96 and 98 in FIGS. 4, 5 and 6, respectively.

The system 210 further includes a source of pressurized cold cryogen vapor, as is indicated generally by the numeral 270, for supplying pressurized cold cryogen vapor, as is indicated by an arrow 271, to a conduit or "header" 273. Cold cryogen vapor is ducted from the header 273 to control valves 272, 274, 276, as is indicated by arrows 282, 284, 286. The valves 272, 274, 276 respond to electrical or pneumatic signals, as indicated by arrows 292, 294, 296, from the control unit 250. When the valves 272, 274, 276 are operated to permit the passage of pressurized cold cryogen vapor therethrough, the vapor is delivered into the flow lines 262, 264, 266 which feed into the molds 90, as indicated by arrows 302, 304, 306.

The control unit 250 operates to generate signals 252, 254, 256 and 292, 294, 296 which effect openings and closings of the valves 232, 234, 236 and 272, 274, 276 so that cold cryogen vapor is delivered into the cavities of the molds 90 at the most opportune times and for appropriate lengths of time to efficiently and expeditiously effect cooling (i.e., solidification) of articles therein.

A typical blowing of a hollow blank or parison 54 in one of the mold assemblies 90 to form a large volume (e.g., two liter) bottle 100 can be carried out using about a 1 second flow of ambient air into the mold assembly 90 to conform the hot glass to the final molded configuration of the bottle 100, with the air having a temperature of about 90-100 degrees Fahrenheit, and followed by a flow of cold cryogen vapor at about −20 degrees Fahrenheit for about 2 seconds to provide a flow of cooling gas that will expedite solidification of the molten glass. The temperature and duration of the cryogen vapor flow can be adjusted to optimize cryogen usage for a selected rate of bottle production.

Figure 9:
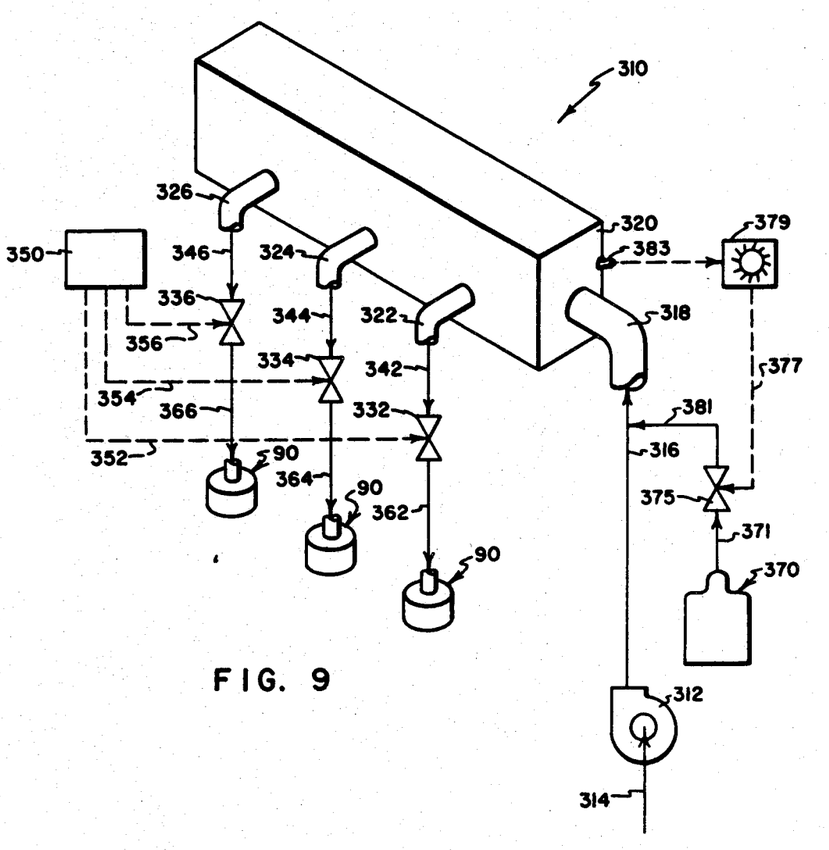
FIG. 9 is a schematic diagram of a "less preferred practice" of the invention of the referenced Parent Case; and, FIG. 10 is a schematic diagram of a gas supply system that incorporates features of the present invention.

Referring to FIG. 9, what has been described in the referenced Parent Case as being a "less preferred" practice of the invention of the Parent Case, is depicted in conjunction with a gas supply system 310. The system 310 includes a blower 312 for receiving ambient air, as is indicated by an arrow 314, and for compressing the ambient air 314 to form a pressurized supply of ambient air, as is indicated by an arrow 316. A source of pressurized cold cryogen vapor, as is indicated generally by the numeral 370, is provided for supplying cold cryogen vapor to a control valve 375, as is indicated by an arrow 371. The control valve 375 operates in response to an electrical or pneumatic signal 377 from a control unit 379 to duct pressurized cold cryogen vapor (indicated by an arrow 381) into the flow of pressurized ambient air which is delivered through a conduit 318 into a manifold 320. A temperature sensor 383 provides a signal 385 to the control unit 379 that is indicative of the temperature of the gas within the manifold 320. The control unit 379 operates the valve 375 to introduce only such cryogen into the manifold 320 as is needed to maintain a gas temperature therein typically of about 35 degrees Fahrenheit. Gas from the manifold 320 is ducted by conduits 322, 324, 326 to valves 332, 334, 336, as is indicated by arrows 342, 344, 346. The valves 332, 334, 336 operate in response to signals 352, 354, 356 that are received from a control unit 350 to deliver blowing and/or cooling gases to the mold assemblies 90, as indicated by arrows 362, 364, 366.

As is discussed in the referenced Parent Case, the system 310 of FIG. 9 represents a "less preferred practice" of the invention of the Parent Case because, among other reasons, the gas mixture that is contained within the manifold 320 cannot be much lower than about 35 degrees Fahrenheit without causing ice to form in the manifold 320. However, as is noted in the referenced Parent Case, the 35 degree Fahrenheit temperature limitation can be overcome by drying the compressed ambient air flow 316, thereby eliminating moisture so that temperatures lower than 35 degrees Fahrenheit can be achieved without causing debilitating ice accumulations to form. The system of the present invention represents the work of a continuing program of development that has resulted in the provision of improvements which render what was previously viewed as a "less preferred" embodiment highly functional and quite economically feasible for commercial use.

Figure 10:
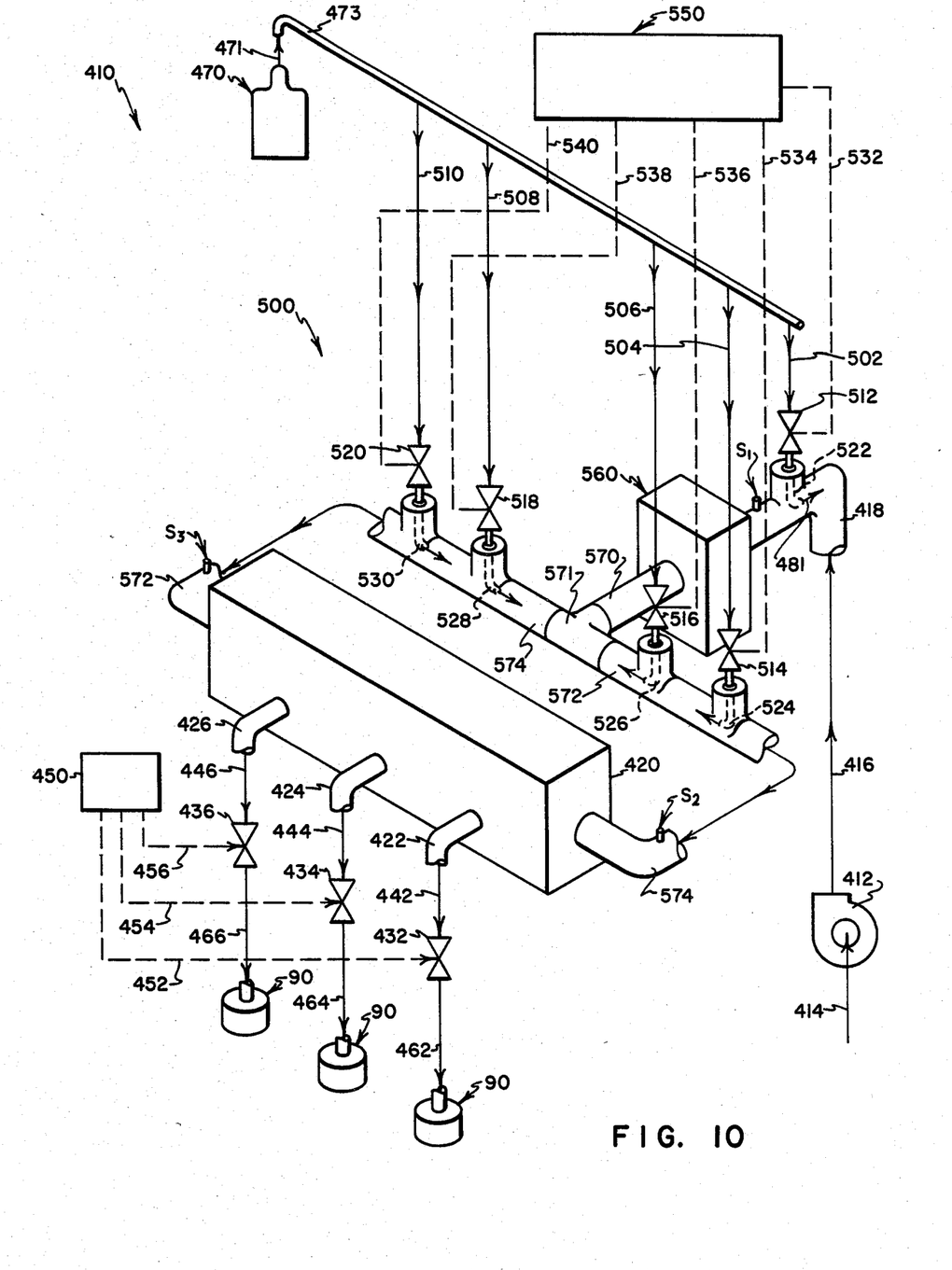

Referring to FIG. 10, a practice of the present invention is depicted in conjunction with a gas supply system that is indicated generally by the numeral 410. The system 410 includes a blower 412 for receiving ambient air, as indicated by an arrow 414, and for compressing the ambient air 414 to form a pressurized supply of ambient air, as is indicated by an arrow 416. The flow of pressurized ambient air 416 is ducted by a conduit 418 to a treatment and mixing system that is indicated generally by a numeral 500. As will be explained, the system 500 provides a staged mixing of the ambient air flow 416 with cold cryogen vapor, and ducts a mixture of dried ambient air and cold cryogen vapor to an insulated manifold 420. Gas from the manifold 420 is ducted by conduits 422, 424, 426 to valves 432, 434, 436, as is indicated by arrows 442, 444, 446. The valves 432, 434, 436 operate in response to signals 452, 454, 456 that are received from a control unit 450 to deliver blowing gas to the mold assemblies 90, as indicated by arrows 462, 464, 466.

A source of pressurized cold cryogen vapor is indicated generally by the numeral 470. The source 470 supplies cold cryogen vapor, as is indicated by the numeral 471, to a cryogen supply header 473. The header 473 connects with conduits that are indicated schematically by arrows 502, 504, 506, 508, and 510. The conduits 502, 504, 506, 508, and 510 connect, respectively, with control valves 512, 514, 516, 518 and 520 that selectively admit flows of cryogen to inlets or injectors 522, 524, 526, 528 and 530, respectively. The valves 512, 514, 516, 518 and 520 operate in response to electrical or pneumatic signals 532, 534, 536, 538 and 540, respectively, that are received from a control unit 550. The control valve 512 operates in response to the electrical or pneumatic signal 532 from the control unit 550 to duct pressurized cold cryogen vapor (indicated by an arrow 481) into the flow of pressurized ambient air 416 which is traveling through the conduit 418 to a dehumidifier unit 560.

A temperature sensor $S_1$ provides a signal to the control unit 550 that is indicative of the temperature of the gas mixture that is being supplied to the dehumidifier 560. The control unit 550 operates the valve 512 to introduce only such cryogen 481 into the flow of ambient air 416 as is appropriate to introduce to provide a preliminary chill that will facilitate operation of the dehumiditier 560. Typically the temperature of the gas mixture that enters the dehumidifier 560 is about 50 degrees Fahrenheit.

A conduit 570 ducts a dried mixture of ambient air and cryogen vapor from the dehumidifier 560 to a T-joint 571 where the flow divides and is channeled by a pair of conduits 572, 574 into opposite end regions of the manifold 420. While it is preferable for the gas mixture in the manifold 420 to not be much lower in temperature than about 35 degrees Fahrenheit, the dried character of the gas mixture and the insulated nature of the manifold 420 will permit lower temperatures to be maintained, if desired, in the manifold 420.

As the mixture of dried ambient air and cold cryogen vapor travels along the conduit branches 572 and 574 toward opposite ends of the manifold 420, additional cold cryogen vapor is introduced through one or more of the injectors 524, 526, 528, 530. The injectors 524, 526 are operated by the control unit 550 in response to a signal from a temperature sensor $S_2$ that is installed in the conduit 572. The injectors 528, 530 are operated by the control unit 550 in response to a signal from a temperature sensor $S_3$ that is installed in the conduit 574. Preferably the temperature of the gas mixture that is introduced into the manifold 420 is about 30-34 degrees Fahrenheit.

In preferred practice, the pairs of injectors 524, 526 and 528, 530 are operated in such a manner that, one of the injectors of each pair is permitted to defrost while its mate is in active service. The cycle times for defrost vs. active service are such that, after a few minutes of active use (typically about 5 to 10 minutes), an injector is permitted to defrost for an equal period of time while its companion injector assumes an active duty role, whereby debilitating buildups of ice near the injectors is prevented, and any ice that does form is caused to defrost within a few minutes of its formation.

The staged introduction of cold cryogen gas into the flow of ambient air 416 from the blower 412, with at least one injection being made upstream from the dehumidifier 560, and with separate downstream injections being made in the branched conduits 572, 574 has been found to provide a very efficient manner of generating a desired mixture of ambient air and cold cryogen vapor, with a minimal waste of cryogen, and with a maximum of reliability of operation (i.e., "down time" due to debilitating buildups of ice, etc. are minimized). The cost of adding cryogen to ambient air to form a suitably cold blowing gas is quite minimal in comparison with the very substantial increases in production of blown-glass articles that can be achieved.

The system of the present invention (like the system of the invention of the referenced Parent Case), contravenes what has long been taken for granted by those skilled in the art of molding glass articles, namely that gases which are used to effect blow molding and/or cooling of molded glass articles must not be of significantly reduced temperature if they are to perform their functions without detrimentally affecting the quality of the glass articles being molded. As those skilled in the art of glass molding are quite aware, automated machinery for molding glass containers such as bottles and the like has been in use since the early 1900's; however, to the best knowledge of the inventors hereof, during more than 8 decades of use of such automated machinery (i.e., until the development of the systems of the Parent Case), no installation has been made wherein pressurized cold cryogen vapor has been either mixed with or substituted for blow-molding gases and/or cooling gases to provide such gases to the mold cavities of an automated molding machine with temperatures in the range of about 30 to 45 degrees Fahrenheit.

When the concept of the invention of the referenced Parent Case was first related to a number of persons who are acknowledged "experts" in the art of manufacturing glass containers and the like, the reception they gave this concept was one of "it can't possibly work." Stated in another way, what the invention of the Parent Case (and the improved system of the present application) proposes so "flies in the face" of conventional glass molding wisdom as to be "unthinkable." However, in tests of these systems, it has been found that increases in productivity of existing automated glass-molding machinery of at least 15 percent and often more are easily attainable, and at impressively low costs.

A typical blowing of a hollow blank or parison 54 in one of the mold assemblies 90 to form a large volume (e.g. two liter) bottle 100 can be carried out in accordance with the preferred practice of the present invention using about a 3 second flow of cold blowing gas from the manifold 420 into the mold assembly 90 to conform the hot glass to the final molded configuration of the bottle 100 and to expedite solidification of an internal skin of glass that will render the bottle shape-stable. The temperature of the cold blowing gas is typically about 40 to 50 degrees Fahrenheit as it is injected into the mold assembly 90 due to the very hot surrounding environment. The temperature and duration of the cold blowing gas flow can be adjusted to optimize cryogen usage for a selected rate of bottle production.

While a press-molding operation has been depicted in FIGS. 1 through 4 for forming a preliminary glass article in the form of a hollow blank or parison 54, and while a blow-molding operation has been depicted in FIGS. 5 and 6 for forming the final configuration of a glass article such a bottle 100, it will be understood that these processes are conventional in nature, and that features of the present invention are not limited in application to press-molding applications, blow-molding applications, or to other conventional molding techniques that are performed singly or in any given sequence. While the practice of the invention have been illustrated in conjunction with the formation of a glass bottle, it will be understood that features of the invention are not limited to use to the formation of a particular type of glass article.

While reference has been made to "control units" 150, 250, 350, 379, 450 and 550 as providing valve operating signals, those skilled in the art will appreciate that the term "control unit" has been used solely for purposes of simplicity, and that any of a wide variety of conventional devices can be used to provide the described "signals." Indeed, the described signals can be provided manually, by mechanical controllers, by programmable controllers, by sensors which detect appropriate sets of conditions, and/or many other types of conventional, commercially available devices. Accordingly, no detailed description of any one type of control unit is needed to enable those skilled in the art to practice the present invention. There is no one type of controller that is considered "best."

Although the invention has been described in its preferred form with a certain degree of particularity, it will be understood that the present disclosure of the preferred form has been made only by way of example, and that numerous changes in the details of construction and the combination and arrangements of parts and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. In a method of making a hollow glass article by shaping a quantity of molten glass in a mold cavity, the improvement comprising the steps of providing a flow of pressurized cooling gas which has a temperature substantially below that of ambient air, and introducing the flow of cooling gas into the mold cavity interiorly with respect to the hollow glass article being formed in the cavity to directly cool interior surface portions of tne molten glass therein and hasten its solidification, wherein the step of providing the flow of pressurized cooling gas includes:
   (a) providing an insulated manifold means for containing a supply of pressurized cooling gas from which pressurized cooling gas is withdrawn to establish the flow of cooling gas that is introduced into the mold cavity; and,
   (b) ducting a mixture of dried ambient air and cold cryogen vapor into the insulated manifold means to maintain a supply of pressurized cooling gas within the insulated manifold means.

2. The method of claim 1 wherein the step of ducting a mixture of dried ambient air and cold cryogen vapor into the insulated manifold means includes the steps of:
   (a) providing supply conduit means that communicates with the insulated manifold means;
   (b) establishing a flow of dried ambient air traveling through the supply conduit means into the insulated manifold means; and,
   (c) introducing cold cryogen vapor into the flow of dried ambient air as dried ambient air travels through the supply conduit means.

3. The method of claim 2 wherein:
   (a) the step of providing supply conduit means includes the steps of providing at least two separate supply conduits that communicate with the insulated manifold means at spaced locations;
   (b) the step of establishing a flow of dried ambient air traveling through the supply conduit means includes the step of establishing separate flows of dried ambient air traveling through each of the separate supply conduits and into the insulated manifold means at said spaced locations; and,
   (c) the step of introducing cold cryogen vapor includes the steps of introducing cold cryogen vapor into each of the flows of dried ambient air as dried ambient air travels through each of the separate supply conduits.

4. The method of claim 2 wherein the step of introducing cold cryogen vapor into the flow of dried ambient air includes the steps of:
   (a) providing a source of cold cryogen vapor;
   (b) providing a pair of cryogen vapor injector means at spaced locations along the supply conduit means;
   (c) providing cryogen vapor supply means for connecting the source of cryogen vapor with each of the injector means for delivering cold cryogen vapor from the source to each of the injector means; and,
   (d) operating the supply means to deliver cold cryogen vapor from the source through each of the injector means and into the flow of dried ambient air.

5. The method of claim 4 wherein the step of operating the supply means includes the step of selectively delivering cold cryogen vapor from the source through each of the injector means, with the delivery of cold cryogen vapor from the source to the supply means being controlled so that, at periodic intervals, the delivery of cold cryogen vapor to each of the injector means is terminated so that ambient air flowing past the injectors will be permitted to defrost buildups of ice that may have accumulated in the vicinities of the injectors.

6. The method of claim 1 wherein the step of providing a mixture of dried ambient air and cold cryogen vapor includes the steps of:
   (a) providing a source of pressurized ambient air;
   (b) providing means for dehumidifying ambient air;
   (c) providing first conduit means communicating the source of pressurized ambient air with the dehumidifying means to deliver a first flow of ambient air from the source of pressurized ambient air to the dehumidifying means;
   (d) providing second conduit means communicating the dehumidifying means with the insulated manifold means to deliver a second flow of ambient air from the dehumidifying means to the insulated manifold means;
   (e) operating the source of pressurized ambient air and the dehumidifying means to deliver a first flow of pressurized ambient air through the first conduit means to the dehumidifying means, and to deliver a second flow of dried ambient air from the dehumidifying means to the insulated manifold means; and,
   (f) injecting a flow of cold cryogen vapor into at least one of the first and second conduit means to provide said mixture of dried ambient air and cold cryogen vapor.

7. The method of claim 6 wherein the step of injecting a flow of cold cryogen vapor includes the step of injecting cold cryogen vapor at spaced locations along said at least one of the first and second conduit means.

8. The method of claim 6 wherein the step of injecting a flow of cold cryogen vapor includes the steps of injecting at least a first flow of cold cryogen vapor into the first conduit means, and injecting at least a second flow of cold cryogen vapor into the second conduit means.

9. The method of claim 6 wherein the step of injecting a flow of cold cryogen vapor includes the steps of
   (a) providing a plurality of cryogen injection devices that project into said at least one of the first and second conduit means at spaced locations therein;
   (b) providing control means or selectively communicating the plurality of injection devices with a source of cold cryogen vapor; and,
   (c) operating the control means to cycle the injection devices into and out of communication with the source of cold cryogen vapor so that selected ones of the injection devices are cycled "on" and "off" to inject cold cryogen vapor.

10. The method of claim 9 additionally including the step of sensing at least one temperature within at least one portion of the flow of mixed ambient air and cold cryogen vapor, and controlling the injection of cold cryogen vapor into said at least one portion of the flow in response to said sensed temperature.

11. The method of claim 1 wherein the step of providing a flow of cooling gas is carried out such that the flow of cooling gas that is introduced into the mold cavity has a temperature that is at least as low as about 45 degrees Fahrenheit.

12. The method of claim 1 wherein the step of providing a flow of cooling gas further includes the steps of sensing the temperature of the flow of the mixture of cold cryogen vapor and ambient air that is supplied to the insulated manifold means, and regulating the mixing of cold cryogen vapor and ambient air to provide a cooling gas mixture of desired temperature to the insulated manifold means.

13. A method of making a hollow glass article, including the steps of:
   (a) introducing a quantity of molten glass into a mold cavity;
   (b) conforming the quantity of molten glass to a shape defined by the mold cavity to form a hollow glass article; and,
   (c) injecting a pressurized flow of cooling gas into the mold cavity interiorally with respect to the hollow glass article being formed in the cavity, with the flow of cooling gas having a temperature that is substantially below that of ambient air to directly cool interior surface portions of the molten glass article therein and to hasten cooling and solidification thereof so that the glass article will solidify rapidly and can therefore be removed quickly from the mold cavity, wherein the step of providing the flow of pressurized cooling gas includes:
   (a) providing an insulated manifold means for containing a supply of pressurized cooling gas from which pressurized cooling gas is withdrawn to establish the flow of cooling gas that is introduced into the mold cavity; and,
   (b) ducting a mixture of dried ambient air and cold cryogen vapor into the insulated manifold means to maintain a supply of pressurized cooling gas within the insulated manifold means.

14. The method of claim 13 wherein the step of ducting a mixture of dried ambient air and cold cryogen vapor into the insulated manifold means includes the steps of
   (a) providing supply conduit means that communicates with the insulated manifold means;
   (b) establishing a flow of dried ambient air traveling through the supply conduit means into the insulated manifold means; and,
   (c) introducing cold cryogen vapor into the flow of dried ambient air as dried ambient air travels through the supply conduit means.

15. The method of claim 14 wherein:
   (a) the step of providing supply conduit means includes the steps of providing at least two separate supply conduits that communicate with the insulated manifold means at spaced locations;
   (b) the step of establishing a flow of dried ambient air traveling through the supply conduit means includes the step of establishing separate flows of dried ambient air traveling through each of the separate supply conduits and into the insulated manifold means at said spaced locations; and,
   (c) the step of introducing cold cryogen vapor includes the steps of introducing cold cryogen vapor into each of the flows of dried ambient air as dried ambient air travels through each of the separate supply conduits.

16. The method of claim 14 wherein the step of introducing cold cryogen vapor into the flow of dried ambient air includes the steps of:
   (a) providing a source of cold cryogen vapor;
   (b) providing a pair of cryogen vapor injector means at spaced locations along the supply conduit means;
   (c) providing cryogen vapor supply means for connecting the source of cryogen vapor with each of the injector means for delivering cold cryogen vapor from the source to each of the injector means; and, (d) operating the supply means to deliver cold cryogen vapor from the source through each of the injector means and into the flow of dried ambient air.

17. The method of claim 16 wherein the step of operating the supply means includes the step of selectively delivering cold cryogen vapor from the source through each of the injector means, with the delivery of cold cryogen vapor from the source to the supply means being controlled so that, at periodic intervals, the delivery of cold cryogen vapor to each of the injector means is terminated so that ambient air flowing past the injectors will be permitted to defrost buildups of ice that may have accumulated in the vicinities of the injectors.

18. The method of claim 13 wherein the step of providing a mixture of dried ambient air and cold cryogen vapor includes the steps of:
(a) providing a source of pressurized ambient air;
(b) providing means for dehumidifying ambient air;
(c) providing first conduit means communicating the source of pressurized ambient air with the dehumidifying means to deliver a first flow of ambient air from the source of pressurized ambient air to the dehumidifying means;
(d) providing second conduit means communicating the dehumidifying means with the insulated manifold means to deliver a second flow of ambient air from the dehumidifying means to the insulated manifold means;
(e) operating the source of pressurized ambient air and the dehumidifying means to deliver a first flow of pressurized air through the first conduit means to the dehumidifying means, and to deliver a second flow of dried ambient air from the dehumidifying means to the insulated manifold means; and,
(f) injecting a flow of cold cryogen vapor into at least one of the first and second conduit means to provide said mixture of dried ambient air and cold cryogen vapor.

19. The method of claim 18 wherein the step of injecting a flow of cold cryogen vapor includes the step of injecting cold cryogen vapor at spaced locations along said at least one of the first and second conduit means.

20. The method of claim 18 wherein the step of injecting a flow of cold cryogen vapor includes the steps of injecting at least a first flow of cold cryogen vapor into the first conduit means, and injecting at least a second flow of cold cryogen vapor into the second conduit means.

21. The method of claim 18 wherein the step of injecting a flow of cold cryogen vapor includes the steps of:
(a) providing a plurality of cryogen injection devices that project into said at least one of the first and second conduit means at spaced locations therein;
(b) providing control means for selectively communicating the plurality of injection devices with a source of cold cryogen vapor; and,
(c) operating the control means to cycle the injection devices into and out of communication with the source of cold cryogen vapor so that selected ones of the injection devices are cycled "on" and "off" to inject cold cryogen vapor.

22. The method of claim 21 additionally including the step of sensing at least one temperature within at least one portion of the flow of mixed ambient air and cold cryogen vapor, and controlling the injection of cold cryogen vapor into said at least one portion of the flow in response to said sensed temperature.

23. The method of claim 13 wherein the step of providing a flow of cooling gas is carried out such that the flow of cooling gas that is introduced into the mold cavity has a temperature that is at least as low as about 45 degrees Fahrenheit.

24. The method of claim 13 wherein the step of providing a flow of cooling gas further includes the steps of sensing the temperature of the flow of the mixture of cold cryogen vapor and ambient air that is supplied to the insulated manifold means, and regulating the mixing of cold cryogen vapor and ambient air to provide a cooling gas mixture of desired temperature to the insulated manifold means.

25. The method of claim 13 wherein the step of providing a flow of cooling gas is carried out such that the blowing gas which is introduced into the mold cavity has a temperature that is at least as low as about 45 degrees Fahrenheit.

26. The method of claim 13 wherein the step of providing a flow of pressurized cooling gas further includes the steps of sensing the temperature of the flow of the mixture of pressurized cold cryogen vapor and ambient air that is supplied to the insulated manifold means, and regulating the mixing of the flows of cold cryogen vapor and ambient air to provide a cooling gas mixture of desired temperature.

* * * * *